UNITED STATES PATENT OFFICE.

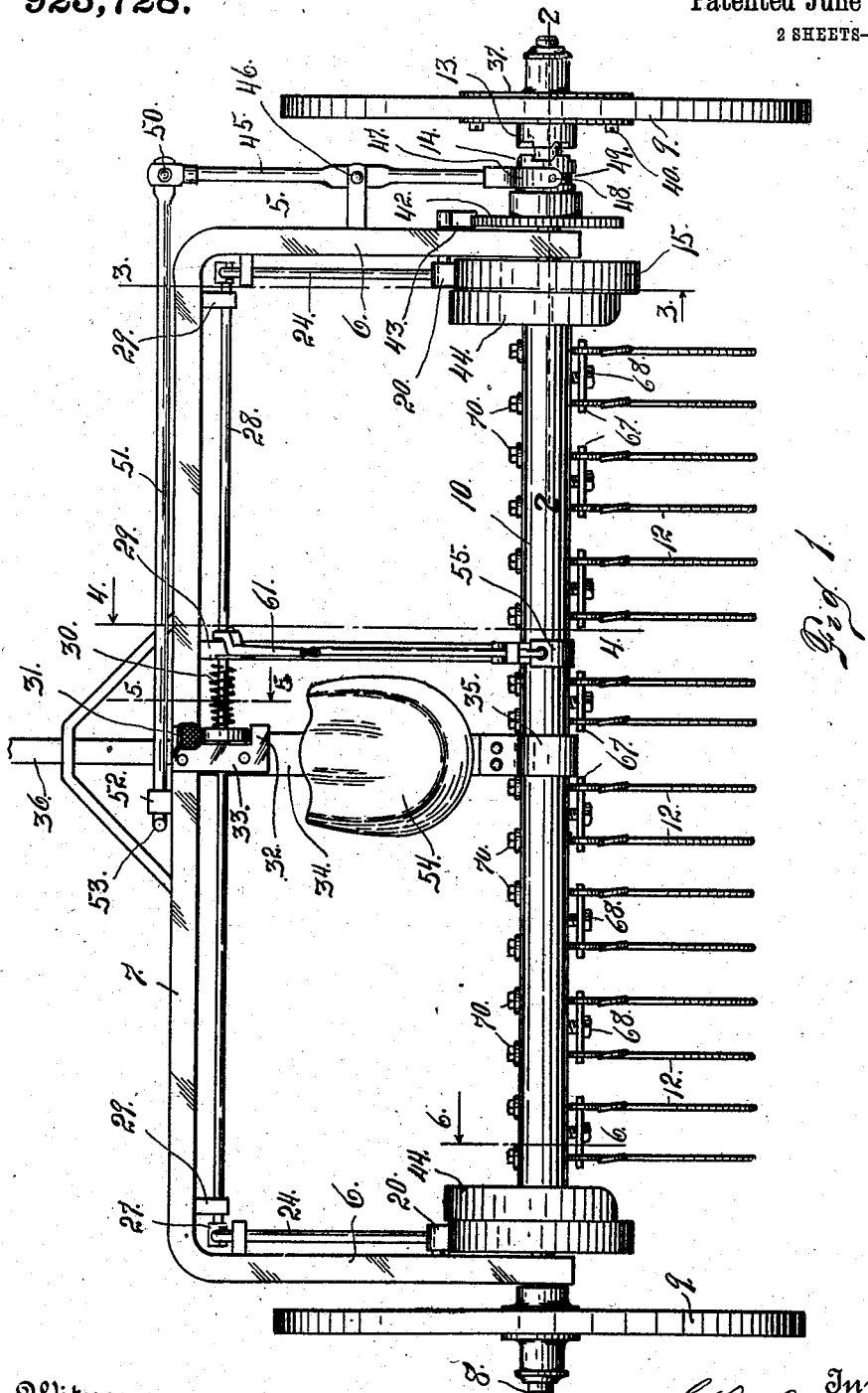

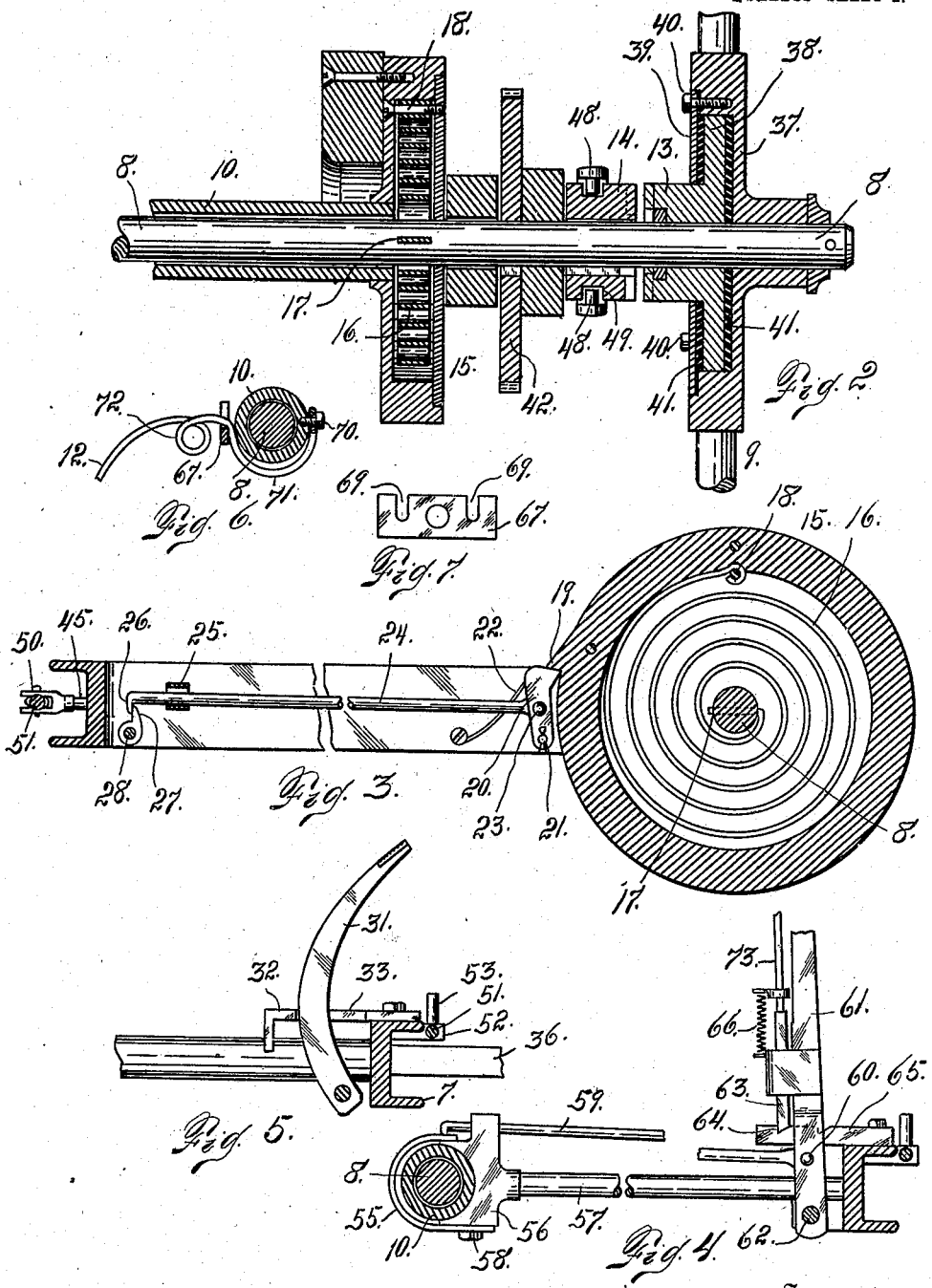

ERNEST V. SWERN, OF DENVER, COLORADO.

REVOLVING HAY-RAKE.

No. 923,728.  Specification of Letters Patent.  Patented June 1, 1909.

Application filed April 27, 1908. Serial No. 429,381.

*To all whom it may concern:*

Be it known that I, ERNEST V. SWERN, citizen of the United States, residing in the city and county of Denver and State of Colorado, have invented certain new and useful Improvements in Revolving Hay-Rakes; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in revolving rakes, more especially intended for use in raking hay. In their ordinary form the rake teeth are connected with a rock shaft adapted to be actuated by means of a lever, which is in reach of the driver sitting upon the seat with which the implement is provided. The teeth are raised for the purpose of releasing the hay when a sufficient quantity has accumulated. It will be understood that by means of an implement of this kind, the hay is raked into what is called windrows.

In my improved construction provision is made for automatically releasing the hay through the instrumentality of a spring or springs connected with a bar or shaft, the latter being mounted to rotate, but normally held against movement by a pawl or dog, which may be released by the pressure of the foot of the driver, against a lever conveniently located for the purpose, allowing the shaft with which the teeth are connected, to make a complete rotation in a direction to release the hay when the rake is in line with the windrow.

An important feature of my improved construction consists in means whereby the rake-actuating springs are placed under tension automatically while the machine is in use. There may be one or more of these springs. Each spring is connected at one extremity with a shaft, which passes through the head or bar with which the teeth are connected, the latter being hollow for the purpose. The ground wheels are mounted to rotate freely upon the shaft. A clutch, however, is splined upon the shaft, and movable to engage a coöperating clutch member with which a ground wheel is provided. When the two clutch members are thrown into engagement with each other, the spring which actuates the rake head is placed under tension, one extremity of the spring being connected with the shaft and the other with the housing which covers the spring, the said housing being fast upon the rake head or the hollow shaft with which the teeth are connected.

My improved invention relates to certain novel features or improvements over the construction disclosed in my original patent No. 670,379, dated March 19, 1901, which features will now be described in detail, reference being made to the accompanying drawings, in which is illustrated an embodiment thereof.

In this drawing, Figure 1 is a top plan view of a hay rake equipped with my improvements. Fig. 2 is a section taken on the line 2—2, Fig. 1, cutting the revolving hollow shaft or rake head, but showing the main shaft of the machine in elevation. Fig. 3 is a section taken on line 3—3, Fig. 1, viewed in the direction of the arrow. Fig. 4 is a section taken on the line 4—4, Fig. 1, looking toward the left, or in the direction of the arrow. Figs. 5 and 6 are sections taken on the lines 5—5 and 6—6 respectively, of Fig. 1. Fig. 7 is a detail elevation illustrating one of the retaining plates.

The same reference characters indicate the same parts in all the views.

Let the numeral 5 designate a framework, which, as shown in the drawing, is U-shaped, and composed of channel iron. The arms 6 of this frame, extend rearwardly from the front bar 7, and in these arms is journaled a shaft 8. Upon the opposite extremities of the shaft are journaled ground wheels 9.

The rake head consists of a sleeve or hollow shaft 10, mounted to rotate upon the shaft 8, and provided with downwardly extending spring teeth 12. One of the ground wheels 9 is provided with a clutch member 13, constructed to coöperate with a similar clutch member 14, splined upon the shaft 8, whereby it may be moved into or out of engagement with the member 13, as may be desired.

When the two clutch members are in engagement, the shaft 8 is interlocked with the ground wheel, and rotated with the latter.

Mounted upon the hollow revolving rake head 10, are two circular housings 15. One extremity of each of these springs is connected with the shaft 8, as shown at 17, while the other extremity is connected with the housing by means of a screw 18. From this it will be understood that as the shaft 8 rotates, the spring will be wound up and placed under tension, since it is of the clock spring order. Each housing 15, is provided with a tooth 19, adapted to be engaged by a pawl 20, pivotally mounted on the frame, as shown at 21, and acted upon by a spring 22, which normally throws its upper or locking extremity rearwardly, whereby it is adapted to engage the tooth 19 of the housing, and when in such position, locking the housing against movement in response to its spring 16. It will be understood that when this spring is under tension, it has a tendency to rotate the housing, and the rake head 10, with which the housing is connected.

Pivotally connected with each pawl 20, midway between its extremities, as shown at 23, is a forwardly extending rod 24, which passes through an opening formed in a guide 25. The forward extremity of this rod is provided with a depending hook 26, adapted to be engaged by a dog 27, fast upon a rock shaft 28, journaled in lugs 29, with which the bar 7 of the framework is provided. This shaft is normally held in such position that its dogs engage the forward extremity of each rod 24, by a coil spring 30, one extremity of which is connected with the shaft, while the other extremity is connected with a lug 29.

Mounted upon the rock shaft 28 and made fast thereto, is a foot lever 31, which occupies a position forward of a part 32 formed integral with a plate 33, mounted upon the frame bar 7, and also connected with a frame member 34, which is secured to the frame bar 7 at one extremity, its other extremity being supported by the head 10, which is mounted to rotate in a ring 35, with which the member 34 is provided. This member 34 is in alinement with the tongue 36 of the implement, the latter being also made fast at its rear extremity to the frame bar 7, at its central point. The part 32 forms a rearward stop to prevent the foot lever 31 from moving farther rearwardly than is desirable, in response to the action of the spring 30. The lever has sufficient forward movement to release the dog 27, from engagement with the forward extremity 26 of each rod 24. As soon, however, as the pressure upon the foot lever ceases to act, the spring 30 acting upon the rock shaft 28, returns each dog 27 to locking engagement with the forward extremity of the rod 24. As soon as the foot lever is pressed, the rods 24 are moved forwardly a sufficient distance to disengage the pawls 20, from the teeth 19, and the housings 15. As soon as this occurs, the housings rotate in response to the recoil of the spring 16, whereby a corresponding movement is imparted to the rake head 10, since the housings are made fast thereto. As soon as the housings and rake head have made a complete revolution, the teeth 19 reëngage the pawls 20, which form stops to lock them against further movement, until the foot lever is again pressed.

The winding of the spring may be accomplished through the action of one or both of the ground wheels. One ground wheel is sufficient for this purpose, and in the construction illustrated in the drawings, no provision is made for interlocking the other ground wheel with the shaft. The hub of the ground wheel 9, which is to perform the spring-winding function, is provided with a circular casing 37, and incloses a friction disk 38. This friction disk is formed integral with the clutch member 13, adapted to coöperate with the clutch member 14, as heretofore explained. The casing 37, is provided on one side with an adjustable plate 39, which surrounds the clutch member 13, and is adapted to close an opening formed in the said casing, the said plate being connected therewith by means of screws 40. Interposed between the disk 38, and the adjacent walls of the casing 37, is a packing material 41, which, when the plate 39 is properly adjusted, causes the disk 38 to rotate with the wheel in the same manner as if the two parts 37 and 38 constituted an integral device. When, however, the shaft has been rotated by the wheel to a sufficient extent to place the spring or springs 16 under the necessary tension, the resistance to the further movement of the shaft, will be sufficient to cause the wheel and its casing 37 to rotate independently of the disk 38, and its clutch member 13, which, in this event is interlocked with the clutch member 14, as heretofore explained. This is a sort of safety construction and is important, to prevent the possible breaking of the spring in the event that the clutch members are not thrown out of engagement, as when driving the implement from place to place, or when it is not in use. This feature may also be important when the machine is in use in the field, since the distance between windrows may under some circumstances be sufficient to more than impart to the spring or springs the desired tension, in which event there would be danger of breaking these springs.

After the spring or springs 16 are wound, the shaft is prevented from making the reverse movement, by means of a ratchet wheel 42, secured to the shaft and engaged by a dog 43. During the spring winding operation, the ratchet wheel slips freely over the dog 43, the arrangement, however, being such as to prevent the reverse movement of the shaft, which otherwise might occur when the clutches 13 and 14 are disengaged.

The hollow rake head 10 is provided at each extremity with a weight 44, which, when the rake head is in its normal position, project forwardly therefrom and form a counter-balance, to facilitate the initial movement of the rake head under the influence of its springs. It will be understood that when the teeth of the head are loaded with hay or other material, considerable resistance will be offered to the movement of the teeth for the purpose of lifting the latter, and disengaging them from said material. These weights aid in this initial operation, and are, therefore, an important feature in the mechanism. Their mass may be of any desired magnitude to accomplish the aforesaid function.

The clutch member 14 is actuated by means of a lever 45, fulcrumed on the framework, as shown at 46, its rear extremity being U-shaped, as shown at 47, and provided with pins 48, which engage a circumferential groove 49, formed in the clutch member 14. The forward extremity of this lever is pivotally connected, as shown at 50, with a rod 51, the latter being slidably supported in a lug 52, mounted upon the frame bar 7. The free extremity of the rod 51, is turned upwardly, as shown at 53, and occupies a position forward of the driver's seat 54, whereby it is in convenient position to be operated by the person in charge of the machine, for the purpose of throwing the clutch members into or out of engagement.

When driving the machine from place to place, it is desirable that the rake head should be so adjusted as to raise the teeth 12 from the ground. In order to accomplish this, I provide a brake band 55, which engages the rake head 10. One extremity of this band is made fast to the rear extremity 56, of a frame bar 57, by a bolt 58, while its opposite extremity is connected with a rod 59, whose forward extremity is pivotally connected, as shown at 60, with a hand lever 61, fulcrumed on the frame as shown at 62. This lever is provided with a rod 73, whose lower portion 63, forms a pawl, adapted to engage a notch 64, formed in a stationary part 65, of the framework, whereby the rod 59 may be secured in position to cause the brake band to lock the rake head against further movement after the head has been allowed sufficient movement to raise the teeth the desired distance from the ground. The rod 73 is acted on by a spring 66, whereby it is normally held in the depressed position whereby it has a tendency to engage the notch of the recess 65, as soon as the lever has been suitably adjusted for the purpose.

While the rake teeth may be secured to the rake head in any suitable manner, I prefer to connect them as illustrated in the drawings (see Figs. 1, 6 and 7). In this form of construction plates 67 are secured to the rake head by means of bolts 68, the said plates being provided with recesses 69, which the teeth are adapted to enter. The forward extremities of the teeth are secured to the hollow head 10, by bolts 70. From this point the teeth are curved downwardly below the rake head, as shown at 71, and thence upwardly, passing through the recesses 69. Beyond these plates a spring coil 72, is formed therein (see Fig. 6). As shown in the drawings, the teeth are arranged in pairs, one pair of teeth engaging each retaining plate 67.

From the foregoing description, the use and operation of my improved machine will be readily understood. Assuming that the machine is in use in a field for raking hay, the clutch member 14 will be thrown into engagement with the clutch member 13, whereby as the machine moves forwardly from one windrow to another, the springs 16 will be placed under tension. Whenever it is desired to release the hay from the rake teeth, the driver presses forwardly upon the foot lever 31, whereby the rock shaft 28, is given a partial rotary movement, being sufficient to cause the dogs 27, to act upon the rods 24, and move the latter forwardly, sufficiently to disengage the pawls 20, from the teeth 19 of the spring housings 15, thus allowing the housings, together with the rake head and teeth, to make a complete rotation, releasing the hay or other material, the said movement being facilitated by the instrumentality of the weights 44, as heretofore explained. When the foot lever is pressed, the movement of the rock shaft 28 is not only sufficient to actuate the rods 24, to disengage the pawls 20, from the teeth 19, but also sufficient to disengage the dogs 26 from the forward extremities of the rods 24, thus releasing the rods, and allowing the same to return automatically to their rearward position under the influence of the springs 22, of the pawls 20. This will cause the upper extremities of the dogs 27, to occupy a position forwardly of the forward extremities of the rods 24, but as soon as the pressure upon the foot lever ceases to act, the spring 30 will actuate the rock shaft 28, to return the dogs 27 to a position in the rear of the extremities of the rods 24, the said rods having sufficient play or oscillating movement in their supports 25, to permit this result.

In the event that the travel of the machine, with the clutch members in engagement, is sufficient to more than place the springs 16 under the proper tension, the disk 41 of the spring-winding wheel, will rotate within the casing 37 of the wheel, by virtue of the construction heretofore described.

Whenever it is desired to drive the machine from place to place, the rake head may be allowed to make a partial rotary movement under the influence of the springs, sufficient to raise the teeth 12 the desired distance from the ground. The brake lever 61, may then be adjusted, to impart a forward movement to the rod 59, sufficient to cause the brake band to engage the rake head with sufficient force to lock the latter against further movement. When the lever has been adjusted as aforesaid, it is locked in the adjusted position by the spring actuated rod 73.

Having thus described my invention, what I claim is:

1. In a hay-rake, the combination with a suitable frame and ground wheels upon which the frame is supported, of a rotary head suitably journaled and provided with rake teeth, a shaft passing through the said head and upon which the latter is journaled, a housing mounted on and made fast to the rotary head, a coil spring located within the housing, one extremity of said spring being connected with the shaft and the other extremity with the housing, and a suitable operative connection between the shaft and one of the ground wheels, whereby as the latter is rotated, the shaft is actuated to place the spring under tension, substantially as described.

2. The combination with a suitable frame and ground wheels, of a shaft journaled in the frame, a head mounted on the shaft and adapted to rotate thereon, housings mounted on and made fast to the head, coil springs located within the housings, one extremity of each spring being connected with the shaft and the other extremity with the housing, a clutch member splined on to the shaft, a coöperating clutch member mounted on one of the ground wheels, and means for throwing the one clutch member into engagement with the other clutch member, whereby the shaft may be caused to interlock with a ground wheel, whereby as the latter is rotated the springs are placed under tension, for the purpose set forth.

3. The combination with a suitable framework, of a shaft journaled therein, ground wheels journaled on the shaft, a rake head mounted to rotate on the shaft, housings mounted on and made fast to the rake head, coil springs inclosed by the housings, one extremity of each spring being made fast to the shaft, and the other extremity to its housing, and a suitable operative connection between the shaft and one of the ground wheels, whereby as the ground wheel is rotated the springs are placed under tension, giving them a tendency to rotate the rake head in a predetermined direction, substantially as described.

4. The combination with a framework, of a shaft journaled therein, ground wheels journaled on the shaft, a rotary rake head mounted on the shaft, housings fast on the rake head, springs inclosed by the housings, their inner extremities being made fast to the shaft and their outer extremities to the housings, a clutch member splined on to the shaft, a coöperating clutch member with which one of the ground wheels is provided, and means for throwing the one clutch member into and out of engagement with the other clutch member, for the purpose set forth.

5. The combination with a framework, of a shaft journaled therein, ground wheels journaled on the shaft, a rake head mounted to rotate on the shaft, housings mounted on the rotary head, coil springs concealed by the housings, their inner extremities being attached to the shaft and their outer extremities to the housings, means for interlocking the shaft with one of the ground wheels whereby the said springs are placed at a tension as the machine travels, spring-held means for locking the rotary head against rotary movement, and means for adjusting the said spring-held means to permit the rotation of the head in response to the recoil of the said springs, substantially as described.

6. The combination of a frame-work and ground wheels, of a shaft journaled therein, a rake head mounted to rotate on the shaft, a housing mounted on the rotary head, a spring inclosed by the housing and with which one of its extremities is connected, its opposite extremity being connected with the shaft whereby as the spring is placed under tension it has a tendency to rotate the head, means engaging the housing for normally locking the head against rotary movement, means for disengaging the locking means to permit the rotary movement of the head, and a weight mounted upon the head and extending forwardly therefrom forming a counterbalance, for the purpose set forth.

7. The combination with a framework, of a shaft journaled therein, ground wheels journaled on the shaft, a head mounted to rotate on the shaft, housings mounted to rotate with the said head, a spring connected with the shaft at one extremity, and with the housings at their other extremities, weights mounted on the rotary head and projecting forwardly therefrom to form a counterbalance, spring-actuated pawls for engaging the housings and normally locking the head against rotary movement, means for disengaging the pawls from the housing to permit the rotary movement of the head, and suitable means for interlocking the shaft with one of the ground wheels, for the purpose set forth.

8. The combination with a frame-work, of a shaft journaled therein, wheels journaled on the shaft, an interlocking connection between the shaft and one of the ground wheels, a rake head mounted to rotate on the shaft, a coil spring connected with the shaft at one extremity, a housing mounted on the rotary head and inclosing the spring which is connected therewith at one extremity, a spring-held pawl engaging the housing for locking the rotary head against movement in response to the action of the spring, means for operating the pawl to release the rotary head, and suitable means for locking the shaft against rotary movement in response to the tension of the spring, substantially as described.

9. The combination with a suitable frame, of a shaft journaled therein, ground wheels journaled on to the shaft, a head mounted to rotate on the shaft, a spring connected at one extremity with the shaft, and a suitable connection between the opposite extremity of the spring and the rotary head, one of the ground wheels being provided with a casing fast thereon, a disk located within the casing and normally rotating with the wheel, and a suitable operative connection between the shaft and the said disk, the connection between the disk and the wheel being such that the wheel will turn independently of the disk when the latter is subjected to a predetermined resistance, due to the winding of the spring, substantially as described.

10. The combination with a suitable frame, of a shaft journaled therein, ground wheels, one of which is journaled on the shaft, a head mounted to rotate on the shaft, the journaled wheel being provided with a disk having a clutch member said disk normally rotating with the wheel but adapted to remain stationary when subjected to a predetermined resistance, while the wheel rotates, a clutch member splined on the shaft and adapted to interlock with the clutch member of the disk, and a spring for actuating the rotary head, the said spring having one extremity attached to the shaft, and a suitable connection between the opposite extremity of the spring and the rotary head, whereby as the shaft is rotated the spring is placed under tension, substantially as described.

11. The combination with a framework, of a shaft journaled in the framework, ground wheels, one of which is journaled on to the shaft, a suitable operative connection with the journaled ground wheel and the shaft, whereby as the said wheel is rotated, the shaft is actuated, a rake head mounted to rotate on the shaft, a spring, and an operative connection between the shaft and rotary head and the respective extremities of the said spring, whereby as the shaft is rotated, the spring is placed under tension to actuate the rotary head, a band brake engaging the rotary head and suitable means for controlling the said brake, substantially as described.

In testimony whereof I affix my signature in presence of two witnesses.

ERNEST V. SWERN.

Witnesses:
  A. J. O'BRIEN,
  HENRY HOWARD, Jr.